(12) United States Patent
Du et al.

(10) Patent No.: US 12,501,302 B2
(45) Date of Patent: Dec. 16, 2025

(54) RELAXATION OF MEASUREMENTS FOR FAILURE DETECTION

(71) Applicant: Nokia Technologies Oy, Espoo (FI)

(72) Inventors: Lei Du, Beijing (CN); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 452 days.

(21) Appl. No.: 18/148,820

(22) Filed: Dec. 30, 2022

(65) Prior Publication Data
US 2023/0224750 A1 Jul. 13, 2023

(51) Int. Cl.
H04W 24/10 (2009.01)
H04B 17/318 (2015.01)

(52) U.S. Cl.
CPC .......... *H04W 24/10* (2013.01); *H04B 17/318* (2015.01)

(58) Field of Classification Search
CPC .............................. H04W 24/10; H04B 17/318
See application file for complete search history.

(56) References Cited

U.S. PATENT DOCUMENTS

| | | | | |
|---|---|---|---|---|
| 11,856,467 B2* | 12/2023 | Koskela | ............... | H04B 7/0695 |
| 2013/0114434 A1* | 5/2013 | Muruganathan | ...... | H04W 16/14 |
| | | | | 370/252 |
| 2014/0286176 A1* | 9/2014 | Ro | .................... | H04W 36/0094 |
| | | | | 370/242 |
| 2016/0360537 A1 | 12/2016 | Palenius et al. | | |
| 2021/0105645 A1 | 4/2021 | Rune et al. | | |
| 2022/0116802 A1* | 4/2022 | Kim | | |
| 2024/0196333 A1* | 6/2024 | Hu | ........................ | H04W 24/08 |
| 2024/0284273 A1* | 8/2024 | Xie | ....................... | H04W 48/16 |
| 2025/0167903 A1* | 5/2025 | Hu | ..................... | H04W 52/0245 |

FOREIGN PATENT DOCUMENTS

| | | | |
|---|---|---|---|
| CN | 112020872 A | 12/2020 | |
| WO | WO-2018237400 A1 * | 12/2018 | .......... H04W 36/305 |
| WO | 2020/204463 A1 | 10/2020 | |

(Continued)

OTHER PUBLICATIONS

3GPP R2-1915234 Nov. 2019 (Year: 2019).*

(Continued)

*Primary Examiner* — Deepa Belur
(74) *Attorney, Agent, or Firm* — McCarter & English LLP

(57) ABSTRACT

Example embodiments of the present disclosure relate to relaxing measurements for failure detection in a cell. In example embodiments, a device performs measurements on one or more reference signals on one or more measurement occasions and determines one or more reference signal received power, RSRP, levels of a cell based on the measurements on the one or more reference signals. Further, the device determines one or more reference RSRP levels reflecting radio link quality or beam quality, one of the reference RSRP levels being associated with one of the determined one or more RSRP levels of the cell. The device evaluates a relaxation criterion based on the one or more reference RSRP levels and the one or more determined RSRP levels of the cell. Moreover, the device relaxes measurements for failure detection in the cell, if it is evaluated that the relaxation criterion has been fulfilled for a time period.

21 Claims, 4 Drawing Sheets

(56) References Cited

FOREIGN PATENT DOCUMENTS

WO      2021/058369 A1      4/2021
WO      2021/254590 A1      12/2021

OTHER PUBLICATIONS

Extended European Search Report received for corresponding European Patent Application No. 23150266.7, dated May 25, 2023, 11 pages.
"Details of Relaxed monitoring for NR UE power saving", 3GPP TSG RAN WG2 Meeting# 108, R2-1915234, Agenda: 6.11.6, Sony, Nov. 18-22, 2019, 4 pages.
"Further details on RRM measurement relaxation", 3GPP TSG-RAN WG2 Meeting #108, R2-1915522, Agenda: 6.11.6, Nokia, Nov. 18-22, 2019, 5 pages.
"3rd Generation Partnership Project; Technical Specification Group Radio Access Network; NR; NR and NG-RAN Overall Description; Stage 2 (Release 17)", 3GPP TS 38.300, V17.1.0, Jun. 2022, pp. 1-209.
"3rd Generation Partnership Project; Technical Specification Group Radio Access Network; NR; Medium Access Control (MAC) protocol specification (Release 17)", 3GPP TS 38.321, V17.1.0, Jun. 2022, pp. 1-241.
"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.
"3rd Generation Partnership Project; Technical Specification Group Radio Access Network; NR; Physical layer procedures for control (Release 17)", 3GPP TS 38.213, V17.1.0, Mar. 2022, pp. 1-245.

Office action received for corresponding European Patent Application No. 23150266.7, dated Jan. 30, 2025, 4 pages.
"WF on RLM/BFD relaxation for UE Power Saving enhancements", 3GPP TSG-RAN WG4 Meeting # 100-e, R4-2115348, Agenda: 9.14, MediaTek inc, Aug. 16-27, 2021, 6 pages.
"WF on RLM/BFD relaxation for UE Power Saving enhancements", 3GPP TSG-RAN WG4 Meeting # 101-e, R4-2120313, Agenda: 9.14, MediaTek inc, Nov. 1-12, 2021, 9 pages.
"3rd Generation Partnership Project; Technical Specification Group Radio Access Network; NR; User Equipment (UE) procedures in Idle mode and RRC Inactive state (Release 16)". 3GPP TS 38.304, V16.6.0, Sep. 2021, pp. 1-39.
"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.
"3rd Generation Partnership Project; Technical Specification Group Radio Access Network; NR; Requirements for support of radio resource management (Release 16)", 3GPP TS 38.133, V16.8.0, Jun. 2021, 3204 pages.
"3rd Generation Partnership Project; Technical Specification Group Radio Access Network; NR; Physical layer procedures for control (Release 16)", 3GPP TS 38.213, V16.6.0, Jun. 2021, pp. 1-187.
"38.133 draftCR on the CSI-RS resource periodicity", 3GPP TSG-RAN WG4 Meeting #100e, R4-2112882, Nokia, Aug. 16-27, 2021, 4 pages.
International Search Report and Written Opinion received for corresponding Patent Cooperation Treaty Application No. PCT/CN2022/070770, dated Aug. 30, 2022, 9 pages.
"Discussion about RLM/BFD measurement relaxation", 3GPP TSG-RAN WG4 Meeting#101-e, R4-2118418, Agenda: 8.14.2.1, Nokia, Nov. 1-12, 2021, 12 pages.

\* cited by examiner

RELAXATION OF MEASUREMENTS FOR FAILURE DETECTION

RELATED APPLICATIONS

This application claims priority from PCT Application No. PCT/CN2022/070770, filed Jan. 7, 2022, which is hereby incorporated by reference in its entirety.

FIELD

Example embodiments of the present disclosure generally relate to the field of communications, and in particular, to a device, method, apparatus and computer readable storage medium for relaxing measurements for failure detection in a cell.

BACKGROUND

Measurements performed by user equipment (UE) on its serving cell so as to monitor a performance of the serving cell, called radio link monitoring (RLM), has been proposed to ensure downlink radio link quality of the serving cell. The downlink radio link quality of the serving cell is monitored based on reference signals provided by its serving cell for the purpose of indicating an Out of Sync status and/or an In Sync status to higher layers.

Further, beam failure detection (BFD) has been proposed to detect qualities of beams for transmission/reception between the UE and the serving cell. Accordingly, a beam recovery or beam change may be performed if a beam failure has been detected.

However, especially for a UE in a connected mode with low mobility and short periodicity of discontinuous reception (DRX), frequent measurements for failure detection will lead to large power consumption. Thus, dealing with the large power consumption to further improve transmission efficiency is still an important issue to be solved.

SUMMARY

In general, example embodiments of the present disclosure provide a device, method, apparatus and computer readable storage medium for relaxing measurements for failure detection in a cell.

In a first aspect, a device is provided which comprises at least one processor and at least one memory including computer program code. The at least one memory and the computer program code are configured to, with the at least one processor, cause the device to perform measurements on one or more reference signals on one or more measurement occasions. The device is caused to determine one or more reference signal received power, RSRP, levels of a cell based on the measurements on the one or more reference signals on the one or more measurement occasions. Further, the device is caused to determine one or more reference RSRP levels reflecting radio link quality or beam quality. One of the one or more reference RSRP levels being associated with one of the determined one or more RSRP levels of the cell. The device is further caused to evaluate a relaxation criterion based on the one or more reference RSRP levels and the one or more determined RSRP levels of the cell. Moreover, the device is caused to, in accordance with an evaluation that the relaxation criterion has been fulfilled for a time period, relax measurements for failure detection in the cell.

In a second aspect, a method is provided. In the method, measurements on one or more reference signals are performed on one or more measurement occasions. Then, one or more reference signal received power, RSRP, levels of a cell are determined based on the measurements on the one or more reference signals on the one or more measurement occasions. Further, one or more reference RSRP levels reflecting radio link quality or beam quality are determined. One of the one or more reference RSRP levels is associated with one of the determined one or more RSRP levels of the cell. A relaxation criterion is evaluated based on the one or more reference RSRP levels and the one or more determined RSRP levels of the cell. Moreover, measurements for failure detection in the cell are relaxed, in accordance with an evaluation that the relaxation criterion has been fulfilled for a time period.

In a third aspect, there is provided an apparatus comprising means for performing the method according to the second aspect.

In a fourth aspect, there is provided a computer readable storage medium comprising program instructions stored thereon. The instructions, when executed by a processor of a device, cause the device to perform the method according to the second aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
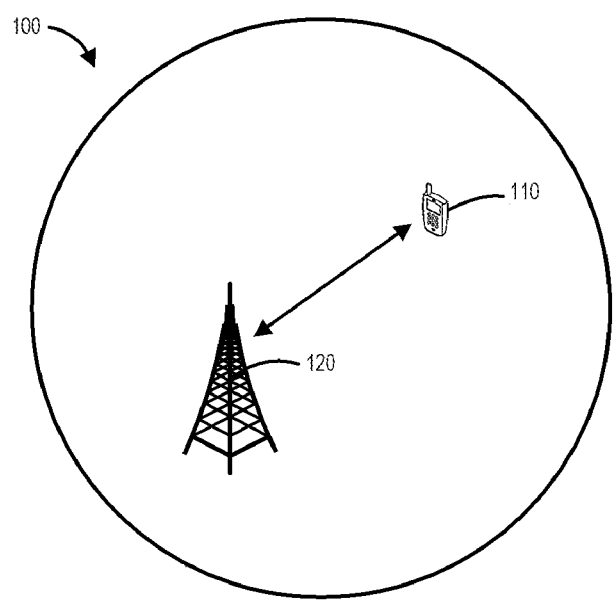
FIG. 1 illustrates an example environment in which example embodiments of the present disclosure can be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the user device include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "circuitry" may refer to one or more or all of the following:
 (a) hardware-only circuit implementations (such as implementations in only analog and/or digital circuitry) and
 (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

In the third generation partnership project (3GPP) Release 16 (Rel-16) and Release 17 (Rel-17), there are some discussions about RLM. A UE may evaluate the downlink radio link quality of the serving cell.

The UE may be able to evaluate whether the downlink radio link quality on the configured RLM-RS resource estimated over the last $T_{Evaluate\_in}$ [ms] period becomes better than $Q_{in}$ within $T_{Evaluate\_in}$ [ms] evaluation period. If the downlink radio link quality becomes better than the $Q_{in}$, the UE will send an In Sync indication to upper layers.

Likewise, the UE may be able to evaluate whether the downlink radio link quality on the configured RLM-RS resource estimated over the last $T_{Evaluate\_out}$ [ms] period becomes worse than $Q_{out}$, which may for example corresponds to a BLER level of 10%, within $T_{Evaluate\_out}$ [ms] evaluation period. If the downlink radio link quality becomes worse than the $Q_{out}$, the UE will send an Out of Sync indication to upper layers. For each Out of Sync indication from a lower layer to upper layers, the UE will increase a counter N310. If the counter N310 reaches a configured maximum number, the UE will start a timer T310, during which the UE continues to measure and evaluate the channel quality. If the channel conditions fail to be improved within the T310, the UE will declare a radio link failure after expiration of the T310.

Similarly, the UE may be able to evaluate whether the downlink radio link quality on the configured reference signal resource estimated over the last $T_{Evaluate\_BFD}$ ms period becomes worse than the threshold $Q_{out\_LR}$ for the purpose of accessing downlink radio link quality of the serving cell beams. The threshold $Q_{out\_LR}$ is defined as the level at which the downlink radio level link of a given resource configuration cannot be reliably received and shall correspond to the BLER level of 10%. If the downlink radio link quality becomes worse than the $Q_{out\_LR}$, the UE will send a beam failure instance indication to upper layers.

However, as discussed above, especially for a UE in a connected mode with low mobility and short periodicity of discontinuous reception, frequent measurements for failure detection will lead to large power consumption. Besides, by now, there is no effective way to decrease power consumption to further improve transmission efficiency.

Example embodiments of the present disclosure provide a scheme of relaxing measurements for failure detection in a cell. With the scheme, a device, such as a UE, performs measurements on one or more reference signals on one or more measurement occasions. The device determines one or more RSRP levels of a cell based on the measurements on the one or more reference signals on the one or more measurement occasions. Further, the device determines one or more reference RSRP levels reflecting radio link quality or beam quality. One of the one or more reference RSRP levels is associated with one of the determined one or more RSRP levels of the cell. The device evaluates a relaxation criterion based on the one or more reference RSRP levels and the one or more determined RSRP levels of the cell. Moreover, the device relaxes measurements for failure detection in the cell, if it is evaluated that the relaxation criterion has been fulfilled for a time period.

This scheme decreases a frequency of measurements for failure detection in the cell flexibly and efficiently by relaxing the measurements. As such, it is allowed to avoid unnecessary signaling overhead and power consumption.

FIG. 1 shows an example environment 100 in which example embodiments of the present disclosure can be implemented.

The environment 100, which may be a part of a communication network, comprises two devices 110 and 120 communicating with each other or with other devices via each other.

The devices 110 and 120 may be implemented by any suitable devices in the communication network. In some example embodiments, the device 110 may be implemented by a terminal device and the device 120 may be implemented by a network device, or vice versa. In some other example embodiments, the devices 110 and 120 may be both implemented by terminal devices or network devices. Just for the purpose of discussion, in this example, the terminal device will be taken as an example of the device 110, and the network device will be taken as an example of the device 120.

It is to be understood that two devices are shown in the environment 200 only for the purpose of illustration, without suggesting any limitation to the scope of the present disclosure. In some example embodiments, the environment 200 may comprise a further device to communicate with the device 110 and the device 120.

The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

Figure 2:
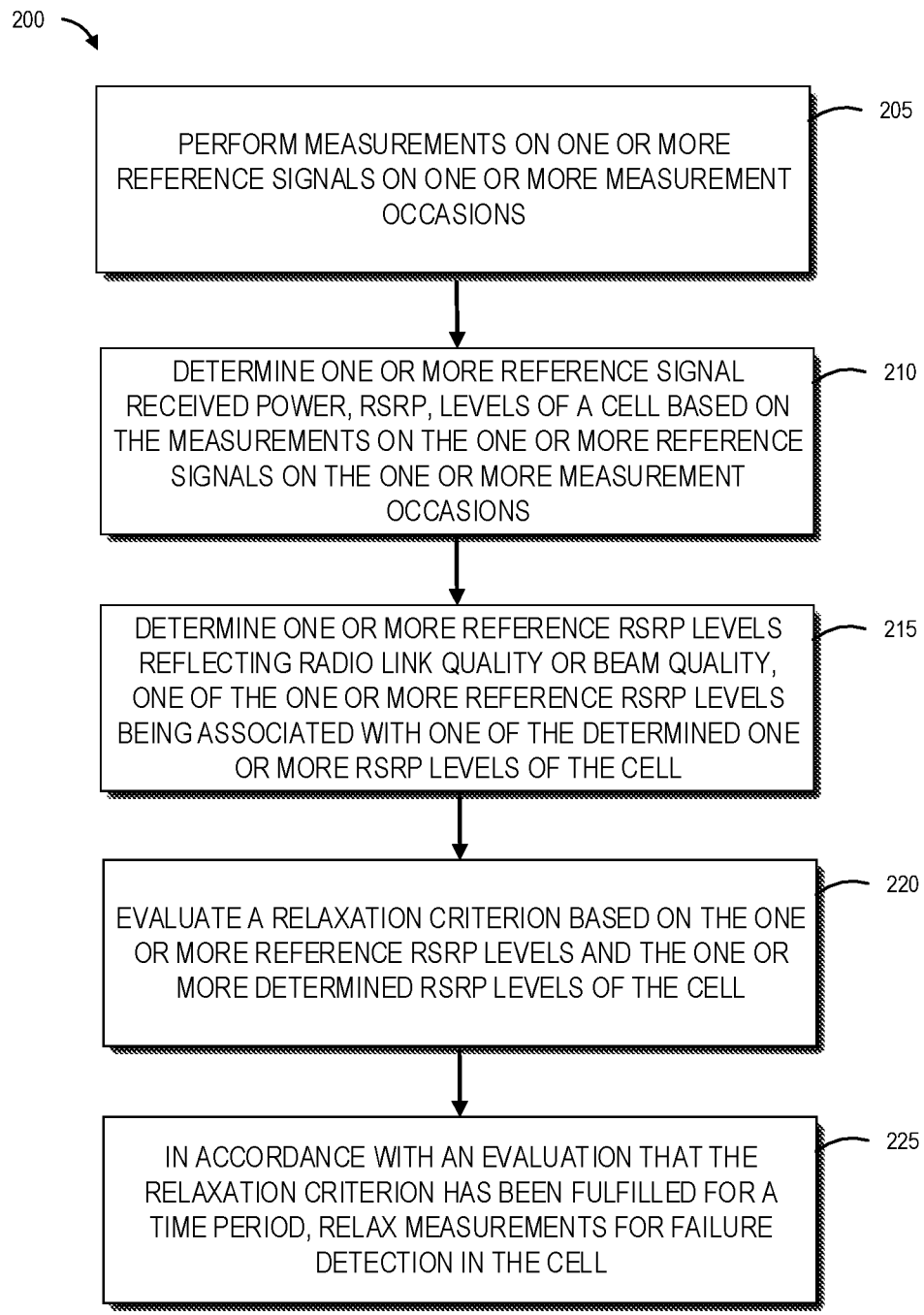
FIG. 2 illustrates a flowchart of an example method according to some example embodiments of the present disclosure.

FIG. 2 shows a flowchart of an example method 200 according to some example embodiments of the present disclosure. The method 200 can be implemented by the device 110 as shown in FIG. 1. For the purpose of discussion, the method 200 will be described with reference to FIG. 1.

As shown in FIG. 2, at block 205, the device 110 performs measurements on one or more reference signals on one or more measurement occasions. For example, the device 110 may measure RSRP of one or more reference signals. For example, the RSRP may be layer 3 (L3) RSRP or L1-RSRP. In some example embodiments, the reference signal may be a synchronization signal block (SSB). In some other example embodiments, the reference signal may be a channel state information reference signal (CSI-RS).

At block 210, the device 110 determines one or more RSRP levels of a cell based on the measurements on the one or more reference signals on the one or more measurement occasions.

For example, the RSRP level may be derived as: RSRP level (dB)=$Q_{rxlevmeas}-(Q_{rxlevmin}+Q_{rxlevminoffset})-P_{compensation}-Q_{offsettemp}$. The detailed description of the above variables may be shown in the following Table 1.

TABLE 1

| | |
|---|---|
| $Qoffset_{temp}$ | Offset temporarily applied to a cell as specified in TS 38.331 [3] (dB) |
| $Q_{rxlevmeas}$ | Measured cell RX level value (RSRP) |
| $Q_{rxlevmin}$ | Minimum required RX level in the cell (dBm). If the UE supports SUL frequency for this cell, $Q_{rxlevmin}$ is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else $Q_{rxlevmin}$ is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122 [9]. |
| $P_{compensation}$ | For FR1, if the UE supports the additionalPmax in the NR-NS-PmaxList, if present, in SIB1, SIB2 and SIB4: max($P_{EMAX1} - P_{PowerClass}$, 0) − (min($P_{EMAX2}, P_{PowerClass}$) − min($P_{EMAX1}, P_{PowerClass}$)) (dB); else: max($P_{EMAX1} - P_{PowerClass}$, 0) (dB) For FR2, $P_{compensation}$ is set to 0. |

In some example embodiments, if beam consolidation is applied, for example, If nrofSS-BlocksToAverage and absThreshSS-BlocksConsolidation are configured, and the highest beam measurement quantity value is higher than absThreshSS-BlocksConsolidation, the cell RSRP equals to the linear power scale average of the highest beam measurement quantity values above absThreshSS-BlocksConsolidation where the total number of averaged beams shall not exceed nrofSS-BlocksToAverage, the device 110 may determine the RSRP level of the cell by averaging measurements on the one or more reference signals over both time scale and multiple beams. For example, related measurement parameters may be configured in the measObject and reportConfig. In this case, nrofSS-BlocksToAverage and absThreshSS-BlocksConsolidation may be configured. The nrofSS-BlocksToAverage may be used to limit the total number of beams to be averaged. The absThreshSS-BlocksConsolidation may be used to constraint that only the highest N (N≤nrofSS-BlocksToAverage) RSRP averaged over time scale above absThreshSS-BlocksConsolidation (if any) may be used to determine the RSRP level to be averaged over multiple beams of the cell for a measurement occasion. In this case, the device 110 may determine the first N RSRP averaged over a measurement period, for example, comprising 5 measurement occasions. If the highest RSRP averaged over time scale is higher than the absThreshSS-BlocksConsolidation, the device 110 may determine the RSRP level of the cell for the measurement occasion based on the first N RSRP averaged over time scale higher than the absThreshSS-BlocksConsolidation (if any). For example, the RSRP level of the cell for the measurement occasion may equal to a average of the N RSRP averaged over time scale. Otherwise, if the highest RSRP averaged over time scale is not higher than the absThreshSS-BlocksConsolidation, or any of the parameters is not configured, the RSRP level of the cell for the measurement occasion may equal to the highest RSRP averaged over time scale. For example, the determination of the RSRP level of the cell with beam consolidation applied will be discussed with reference FIG. 3.

Figure 3:
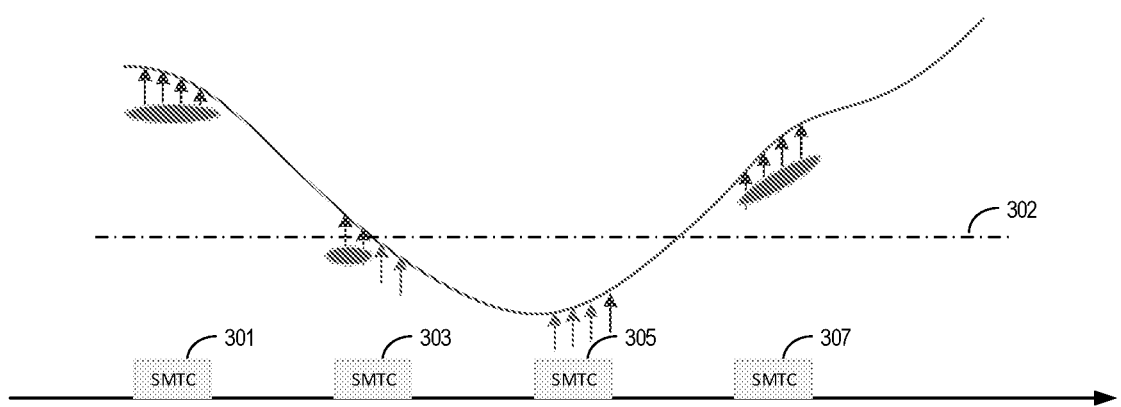
FIG. 3 illustrates determination of RSRP level of a cell on measurement occasions with beam consolidation applied.

FIG. 3 illustrates determination of RSRP level of a cell on measurement occasions with beam consolidation applied. In FIG. 3, the measurement occasion may be a SSB measurement timing configuration (SMTC) window and the nrofSS-BlocksToAverage may be set to 4. As shown in FIG. 3, in the SMTC window 301, the RSRP level of the cell may be derived as an average of 4 beams i.e. the 4 RSRP level measured on each of the SSB, for the reason that 4 beams have the RSRP averaged over time scale higher than the absThreshSS-BlocksConsolidation 302. The time scale may be the measurement period for intra-frequency measurement, for example, the five SMTC periodicity. In the SMTC window 303, the RSRP level of the cell may be derived as an average of 2 beams, for the reason that only 2 beams have the RSRP averaged over time scale higher than the absThreshSS-BlocksConsolidation 302. In the SMTC window 305, the RSRP level of the cell may be derived as the highest RSRP averaged over time scale, for the reason that no beam has the RSRP averaged over time scale higher than the absThreshSS-BlocksConsolidation 302. In the SMTC window 307, the RSRP level of the cell may be derived as an average of 4 beams, for the reason that 4 beams have the RSRP averaged over time scale higher than the absThreshSS-BlocksConsolidation 302. As a result, the RSRP level of the cell may be not based on fixed number of reference signals, that is, beams, and the number of reference signals used to derive the RSRP level of the cell may change from time to time.

In some example embodiments, if the beam consolidation is not applied, the device 110 may determine the highest RSRP of one or more reference signals on a measurement occasion of the one or more measurement occasions. Then, the device 110 may determine a RSRP level of the cell for the measurement occasion of the one or more measurement occasions based on the highest RSRP. For example, the RSRP level of the cell for the measurement occasion of the one or more measurement occasions may equal to the highest RSRP of one or more reference signals on the measurement occasion of the one or more measurement occasions.

In some example embodiments, if the beam consolidation is not applied, the device 110 may determine the highest RSRP of one or more reference signals on a measurement occasion of the one or more measurement occasions. Further, the device 110 may determine at least one previous highest RSRP of one or more reference signals on at least one previous measurement occasion. Then, the device 110 may determine a RSRP level of the cell for the measurement occasion of the one or more measurement occasions, based on the highest RSRP for the measurement occasion of the one or more measurement occasions and the least one previous highest RSRP for the at least one previous measurement occasion. For example, the RSRP level of the cell for the measurement occasion of the one or more measurement occasions may equal to an average of the highest RSRP for the measurement occasion of the one or more measurement occasions and the least one previous highest RSRP for the at least one previous measurement occasion. In one example, the RSRP level of the cell for the measurement occasion of the one or more measurement occasions may equal to an average of the highest RSRP for the measurement occasion of the one or more measurement occasions and the previous four highest RSRP values for the four previous measurement occasions.

Referring back to FIG. 2, at block 215, the device 110 determines one or more reference RSRP levels reflecting radio link quality or beam quality. One of the one or more reference RSRP levels is associated with one of the determined one or more RSRP levels of the cell.

In some example embodiments, the device 110 may determine the one or more reference RSRP levels reflecting the radio link quality or beam quality based on at least one of: a threshold quality (referred to as a first threshold quality) for controlling when a user equipment is required to perform RSRP measurements on neighboring cells, for example s-MeasureConfig for RLM or s-measure for BFD; another threshold quality (referred to as a second threshold quality), for example Qin, or a further threshold quality (referred to as a third threshold quality), for example Qout, for the purpose of monitoring downlink radio link quality and/or beam quality. Alternatively, the one or more reference RSRP levels may be determined by other threshold parameters configured by the network 110 or defined by the device 120. For example, the user equipment may be the user equipment with low mobility.

In the example embodiments where the one or more reference RSRP levels may be determined based on the first threshold quality, for example, s-MeasureConfig for RLM or s-measure for BFD, the device 110 may determine the RSRP level of the determined one or more RSRP levels of the cell as the associated reference RSRP level of the one or more reference RSRP levels, if it determines that the RSRP level of the determined one or more RSRP levels of the cell is higher than or no lower than the first threshold quality.

Alternatively, the device 110 may determine the RSRP level of the determined one or more RSRP levels of the cell as the associated reference RSRP level of the one or more reference RSRP levels, if it determines that the RSRP level of the determined one or more RSRP levels of the cell is higher than the absThreshSS-BlocksConsolidation mentioned above.

In the example embodiments where the one or more reference RSRP levels may be determined based on the second threshold quality, for example Qin, the device 110 may determines a RSRP level of the determined one or more RSRP levels of the cell as the associated reference RSRP level of the one or more reference RSRP levels, if it determines that the radio link quality is higher than the second threshold quality, for example Qin, in the cell within a time period for evaluation of relaxation criterion. For example, the reference RSRP level may be updated as the current RSRP level of the cell, if the device 110 has sent at least one In Sync indication within the time period.

In the example embodiments where the one or more reference RSRP levels may be determined based on the third threshold quality, for example Qout, the device 110 may determine a RSRP level of the determined one or more RSRP levels of the cell as the associated reference RSRP level of the one or more reference RSRP levels, if it determines that the radio link quality is no lower than the third threshold quality, for example Qout, or the user equipment has not sent any Out of Sync indication within a time period for evaluation of a relaxation criterion.

In some example embodiments, the device 110 may determine a RSRP level of the determined one or more RSRP levels of the cell as the associated reference RSRP level of the one or more reference RSRP levels of the cell, if it determines that no beam failure hs occurred in the cell within a time period for evaluation of relaxation criterion. For example, the reference RSRP level may be updated as the current RSRP level of the cell, if the device 110 has not sent any beam failure instance indication to higher layers during the time period.

In some example embodiments, the device 110 may determine a RSRP level of the determined one or more RSRP levels of the cell as the associated reference RSRP level of the one or more reference RSRP levels, if it has sent at least one Layer 1 (L1)-RSRP measurement to higher layers during a time period for evaluation of a relaxation criterion.

In some example embodiments, the device 110 may determine a RSRP level of the determined one or more RSRP levels of the cell as the associated reference RSRP level of the one or more reference RSRP levels, in an event comprising at least one of a radio link failure, radio resource control reestablishment, a beam failure detection, beam recovery or redirection. That is, the reference RSRP level of may be updated as the current RSRP level of the cell, if connection failure occurs or the connection failure recoveries. Alternatively, the reference RSRP level may be reset to an initial value e.g. infinite.

In some example embodiments, the device 110 may determine a RSRP level of the determined one or more RSRP levels of the cell as the associated reference RSRP level of the one or more reference RSRP levels, after a handover. In this case, for example, the reference RSRP level may be updated as the current RSRP level of the cell. Alternatively, the reference RSRP level may be not updated, that is, device 110 may reuse the previous reference RSRP level before the handover or be reset to an initial value e.g. infinite.

In some example embodiments, the device 110 may determine a RSRP level of the determined one or more RSRP levels of the cell as the associated reference RSRP level of the one or more reference RSRP levels, after beam change. In this case, for example, the reference RSRP level may be updated as the current RSRP level of the cell. Alternatively, the reference RSRP level may be not updated, that is, the device 110 may reuse the previous reference RSRP level before the beam change or be reset to an initial value e.g. infinite.

As shown in FIG. 2, at block 220, the device 110 evaluates a relaxation criterion based on the one or more reference RSRP levels and the one or more determined RSRP levels of the cell.

In some example embodiments, the relaxation criterion may be evaluated by the device 110 to be fulfilled, if a difference between at least one of the determined one or more RSRP levels of the cell and the associated reference RSRP level of the one or more reference RSRP levels is within a threshold level.

In some example embodiments, the relaxation criterion may be evaluated by the device 110 to be fulfilled, if a result of at least one associated reference RSRP level of the one or more reference RSRP levels minus the RSRP level of the determined one or more RSRP levels of the cell is less than another threshold level. For example, the above mentioned threshold levels may be configured by the device 120.

At block 225, the device 110 relaxes measurements for failure detection in the cell if it is evaluated that the relaxation criterion has been fulfilled for a time period. For example, if the relaxation criterion has been met, the device 110 may decrease a frequency of measurements for failure detection in the cell, such as measurements for RLM and/or BFD. For example, the time period may be configured by the device 120.

In some example embodiments, the measurements for failure detection in the cell may comprise measurements for radio link monitoring. In some other example embodiments, the measurements for failure detection in the cell may comprise measurements for beam failure detection.

In some example embodiments, the device 110 may determine a RSRP level of the determined one or more RSRP levels of the cell as the associated reference RSRP level of the one or more reference RSRP levels, if it determines that the relaxation criterion has not been met for the time period.

As such, for example by taking into account the potential radio link failure, beam failure, handover and/or beam change, relaxation of measurements for failure detection, such as radio link failure declaration or beam failure detection, in the cell may be achieved without causing delay of the failure detection. It greatly benefits a UE in a connected mode with low mobility and short periodicity of discontinuous reception. It is allowed to save both the unnecessary signaling overhead and power consumption.

Figure 4:
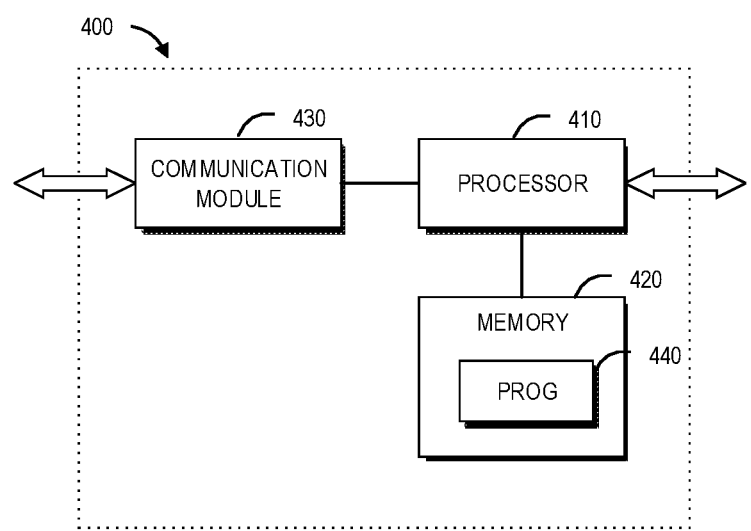
FIG. 4 illustrates a simplified block diagram of a device that is suitable for implementing example embodiments of the present disclosure.

FIG. 4 is a simplified block diagram of a device 400 that is suitable for implementing example embodiments of the present disclosure. The device 400 can be implemented at or as a part of the device 110 or the device 120 as shown in FIG. 1.

As shown, the device 400 includes a processor 410, a memory 420 coupled to the processor 410, a communication module 430 coupled to the processor 410, and a communication interface (not shown) coupled to the communication module 430. The memory 420 stores at least a program 440. The communication module 430 is for bidirectional communications, for example, via multiple antennas. The communication interface may represent any interface that is necessary for communication.

The program 440 is assumed to include program instructions that, when executed by the associated processor 410, enable the device 400 to operate in accordance with the example embodiments of the present disclosure, as discussed herein with reference to FIGS. 1-3. The example embodiments herein may be implemented by computer software executable by the processor 410 of the device 400, or by hardware, or by a combination of software and hardware. The processor 410 may be configured to implement various example embodiments of the present disclosure.

The memory 420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 420 is shown in the device 400, there may be several physically distinct memory modules in the device 400. The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

When the device 400 acts as the device 110 or a part of the device 110, the processor 410 and the communication module 430 may cooperate to implement the method 200 as described above with reference to FIGS. 1-2. All operations and features as described above with reference to FIGS. 1-3 are likewise applicable to the device 400 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIGS. 1-2. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a method comprises: performing measurements on one or more reference signals on one or more measurement occasions; determining one or more reference signal received power, RSRP, levels of a cell based on the measurements on the one or more reference signals on the one or more measurement occasions; determining one or more reference RSRP levels reflecting radio link quality or beam quality, one of the one or more reference RSRP levels being associated with one of the determined one or more RSRP levels of the cell; evaluating a relaxation criterion based on the one or more reference RSRP levels and the one or more determined RSRP levels of the cell; and in accordance with an evaluation that the relaxation criterion has been fulfilled for a time period, relaxing measurements for failure detection in the cell.

In some example embodiments, determining the one or more reference RSRP levels reflecting the radio link quality or beam quality is based on at least one of: a first threshold quality for controlling when a user equipment is required to perform RSRP measurements on neighboring cells; a second threshold quality, Qin, or a third threshold quality, Qout, for the purpose of monitoring downlink radio link quality and/or beam quality.

In some example embodiments, determining the one or more reference RSRP levels comprises: in accordance with a determination that the RSRP level of the determined one or more RSRP levels of the cell is higher than the first threshold quality, determining the RSRP level of the determined one or more RSRP levels of the cell as the associated reference RSRP level of the one or more reference RSRP levels.

In some example embodiments, determining the one or more reference RSRP levels comprises: in accordance with a determination that the radio link quality is higher than the second threshold quality, Qin, in the cell within the time period, determining a RSRP level of the determined one or more RSRP levels of the cell as the associated reference RSRP level of the one or more reference RSRP levels.

In some example embodiments, determining the one or more reference RSRP levels comprises: in accordance with a determination that the radio link quality is no lower than the third threshold quality, Qout, or the user equipment has not sent any Out of Sync indication within the time period, determining a RSRP level of the determined one or more RSRP levels of the cell as the associated reference RSRP level of the one or more reference RSRP levels.

In some example embodiments, the measurements for failure detection in the cell comprises measurements for radio link monitoring and measurements for beam failure detection.

In some example embodiments, the reference signal is a synchronization signal block or a channel state information reference signal, CSI-RS.

In some example embodiments, the method further comprises: evaluating that the relaxation criterion is fulfilled, if a difference between at least one of the determined one or more RSRP levels of the cell and the associated reference RSRP level of the one or more reference RSRP levels is within a threshold level.

In some example embodiments, determining the one or more reference RSRP levels comprises: determining a RSRP level of the determined one or more RSRP levels of the cell as the associated reference RSRP level of the one or more reference RSRP levels, in an event comprising at least one of a radio link failure, radio resource control reestablishment, a beam failure detection, beam recovery or redirection.

In some example embodiments, determining the one or more reference RSRP levels comprises: determining a RSRP level of the determined one or more RSRP levels of the cell as the associated reference RSRP level of the one or more reference RSRP levels, after handover or beam change.

In some example embodiments, determining the one or more RSRP levels of the cell comprises: determining the highest RSRP of one or more reference signals on a measurement occasion of the one or more measurement occasions; and determining, based on the highest RSRP, a RSRP level of the cell for the measurement occasion of the one or more measurement occasions.

In some example embodiments, determining the one or more RSRP levels of the cell comprises: determining the highest RSRP of one or more reference signals on a measurement occasion of the one or more measurement occasions; determining at least one previous highest RSRP of one or more reference signals on at least one previous measurement occasion; and determining a RSRP level of the cell for the measurement occasion of the one or more measurement occasions, based on the highest RSRP for the measurement occasion of the one or more measurement occasions and the least one previous highest RSRP for the at least one previous measurement occasion.

In some example embodiments, the one or more RSRP levels of the cell are determined if the beam consolidation does not apply.

In some example embodiments, the user equipment is the user equipment with low mobility.

In some aspects, a device comprises: at least one processor; and at least one memory including computer program code; the at least one memory and the computer program code configured to, with the at least one processor, cause the device to: perform measurements on one or more reference signals on one or more measurement occasions; determine one or more reference signal received power, RSRP, levels of a cell based on the measurements on the one or more reference signals on the one or more measurement occasions; determine one or more reference RSRP levels reflecting radio link quality or beam quality, one of the one or more reference RSRP levels being associated with one of the determined one or more RSRP levels of the cell; evaluate a relaxation criterion based on the one or more reference RSRP levels and the one or more determined RSRP levels of the cell; and in accordance with an evaluation that the relaxation criterion has been fulfilled for a time period, relax measurements for failure detection in the cell.

In some example embodiments, the device is caused to determine the one or more reference RSRP levels reflecting the radio link quality or beam quality based on at least one of: a first threshold quality for controlling when a user equipment is required to perform RSRP measurements on neighboring cells; a second threshold quality, Qin, or a third threshold quality, Qout, for the purpose of monitoring downlink radio link quality and/or beam quality.

In some example embodiments, the device is caused to determine the one or more reference RSRP levels by: in accordance with a determination that the RSRP level of the determined one or more RSRP levels of the cell is higher than the first threshold quality, determining the RSRP level of the determined one or more RSRP levels of the cell as the associated reference RSRP level of the one or more reference RSRP levels.

In some example embodiments, the device is caused to determine the one or more reference RSRP levels by: in accordance with a determination that the radio link quality is higher than the second threshold quality, Qin, in the cell within the time period, determining a RSRP level of the determined one or more RSRP levels of the cell as the associated reference RSRP level of the one or more reference RSRP levels.

In some example embodiments, the device is caused to determine the one or more reference RSRP levels by: in accordance with a determination that the radio link quality is no lower than the third threshold quality, Qout, or the user equipment has not sent any Out of Sync indication within the time period, determining a RSRP level of the determined one or more RSRP levels of the cell as the associated reference RSRP level of the one or more reference RSRP levels.

In some example embodiments, the measurements for failure detection in the cell comprise measurements for radio link monitoring and measurements for beam failure detection.

In some example embodiments, the reference signal is a synchronization signal block or a channel state information reference signal, CSI-RS.

In some example embodiments, the device is further caused to: evaluate that the relaxation criterion is fulfilled, if a difference between at least one of the determined one or more RSRP levels of the cell and the associated reference RSRP level of the one or more reference RSRP levels is within a threshold level.

In some example embodiments, the device is caused to determine the one or more reference RSRP levels by: determining a RSRP level of the determined one or more RSRP levels of the cell as the associated reference RSRP level of the one or more reference RSRP levels, in an event comprising at least one of a radio link failure, radio resource control reestablishment, a beam failure detection, beam recovery or redirection.

In some example embodiments, the device is caused to determine the one or more reference RSRP levels by: determining a RSRP level of the determined one or more RSRP levels of the cell as the associated reference RSRP level of the one or more reference RSRP levels, after handover or beam change.

In some example embodiments, the device is caused to determine the one or more RSRP levels of the cell by: determining the highest RSRP of one or more reference signals on a measurement occasion of the one or more measurement occasions; and determining, based on the highest RSRP, a RSRP level of the cell for the measurement occasion of the one or more measurement occasions.

In some example embodiments, the device is caused to determine the one or more RSRP levels of the cell by: determining the highest RSRP of one or more reference signals on a measurement occasion of the one or more measurement occasions; determining at least one previous highest RSRP of one or more reference signals on at least one previous measurement occasion; and determining a RSRP level of the cell for the measurement occasion of the one or more measurement occasions, based on the highest RSRP for the measurement occasion of the one or more measurement occasions and the least one previous highest RSRP for the at least one previous measurement occasion.

In some example embodiments, the device is caused to determine the one or more RSRP levels of the cell if the beam consolidation does not apply.

In some example embodiments, the user equipment is the user equipment with low mobility.

In some aspects, an apparatus comprises: means for performing measurements on one or more reference signals on one or more measurement occasions; means for determining one or more reference signal received power, RSRP, levels of a cell based on the measurements on the one or more reference signals on the one or more measurement occasions; means for determining one or more reference RSRP levels reflecting radio link quality or beam quality, one of the one or more reference RSRP levels being associated with one of the determined one or more RSRP levels of the cell; means for evaluating a relaxation criterion based on the one or more reference RSRP levels and the one or more determined RSRP levels of the cell; and means for, in accordance with an evaluation that the relaxation criterion has been fulfilled for a time period, relaxing measurements for failure detection in the cell.

In some example embodiments, determining the one or more reference RSRP levels reflecting the radio link quality or beam quality is based on at least one of: a first threshold quality for controlling when a user equipment is required to perform RSRP measurements on neighboring cells; a second threshold quality, Qin, or a third threshold quality, Qout, for the purpose of monitoring downlink radio link quality and/or beam quality.

In some example embodiments, the means for determining the one or more reference RSRP levels comprises: means for, in accordance with a determination that the RSRP level of the determined one or more RSRP levels of the cell is higher than the first threshold quality, determining the RSRP level of the determined one or more RSRP levels of the cell as the associated reference RSRP level of the one or more reference RSRP levels.

In some example embodiments, the means for determining the one or more reference RSRP levels comprises: means for, in accordance with a determination that the radio link quality is higher than the second threshold quality, Qin, in the cell within the time period, determining a RSRP level of the determined one or more RSRP levels of the cell as the associated reference RSRP level of the one or more reference RSRP levels.

In some example embodiments, the means for determining the one or more reference RSRP levels comprises: means for, in accordance with a determination that the radio link quality is no lower than the third threshold quality, Qout, or the user equipment has not sent any Out of Sync indication within the time period, determining a RSRP level of the determined one or more RSRP levels of the cell as the associated reference RSRP level of the one or more reference RSRP levels.

In some example embodiments, the measurements for failure detection in the cell comprise measurements for radio link monitoring and measurements for beam failure detection.

In some example embodiments, the reference signal is a synchronization signal block or a channel state information reference signal, CSI-RS.

In some example embodiments, the apparatus further comprises: means for evaluating that the relaxation criterion is fulfilled, if a difference between at least one of the determined one or more RSRP levels of the cell and the associated reference RSRP level of the one or more reference RSRP levels is within a threshold level.

In some example embodiments, the means for determining the one or more reference RSRP levels comprises: means for determining a RSRP level of the determined one or more RSRP levels of the cell as the associated reference RSRP level of the one or more reference RSRP levels, in an event comprising at least one of a radio link failure, radio resource control reestablishment, a beam failure detection, beam recovery or redirection.

In some example embodiments, the means for determining the one or more reference RSRP levels comprises: means for determining a RSRP level of the determined one or more RSRP levels of the cell as the associated reference RSRP level of the one or more reference RSRP levels, after handover or beam change.

In some example embodiments, the means for determining the one or more RSRP levels of the cell comprises: means for determining the highest RSRP of one or more reference signals on a measurement occasion of the one or more measurement occasions; and means for determining, based on the highest RSRP, a RSRP level of the cell for the measurement occasion of the one or more measurement occasions.

In some example embodiments, the means for determining the one or more RSRP levels of the cell comprises: means for determining the highest RSRP of one or more reference signals on a measurement occasion of the one or more measurement occasions; means for determining at least one previous highest RSRP of one or more reference signals on at least one previous measurement occasion; and means for determining a RSRP level of the cell for the measurement occasion of the one or more measurement occasions, based on the highest RSRP for the measurement occasion of the one or more measurement occasions and the least one previous highest RSRP for the at least one previous measurement occasion.

In some example embodiments, the one or more RSRP levels of the cell are determined if the beam consolidation does not apply.

In some example embodiments, the user equipment is the user equipment with low mobility.

In some aspects, a computer readable storage medium comprises program instructions stored thereon, the instructions, when executed by a processor of a device, causing the device to perform the method according to some example embodiments of the present disclosure.

We claim:

1. A device, comprising:
   at least one processor; and
   at least one memory storing instructions that, when executed by the at least one processor, cause the device at least to:
   perform measurements on one or more reference signals on one or more measurement occasions;
   determine one or more reference signal received power, RSRP, levels of a cell based on the measurements on the one or more reference signals on the one or more measurement occasions;
   determine one or more reference RSRP levels reflecting radio link quality or beam quality after handover or beam change, one of the one or more reference RSRP levels being associated with one of the determined one or more RSRP levels of the cell;
   evaluate a relaxation criterion based on the one or more reference RSRP levels and the determined one or more RSRP levels of the cell; and
   in accordance with an evaluation that the relaxation criterion has been fulfilled for a time period, relax measurements for at least one of radio link monitoring or beam failure detection in the cell,
   wherein the determining of the one or more reference RSRP levels comprises, in accordance with a determination that the device has not sent an out of sync indication within the time period, determining a RSRP level of the determined one or more RSRP levels of the cell as the associated reference RSRP level.

2. The device of claim 1, wherein the device is caused to determine the one or more reference RSRP levels reflecting the radio link quality or beam quality based on at least one of:
   a first threshold quality for controlling when the device is required to perform RSRP measurements on neighboring cells;
   a second threshold quality, Qin, or a third threshold quality, Qout, for the purpose of monitoring downlink radio link quality and/or beam quality.

3. The device of claim 2, wherein the device is caused to determine the one or more reference RSRP levels by:
   in accordance with a determination that the RSRP level of the determined one or more RSRP levels of the cell is higher than the first threshold quality, determining the RSRP level of the determined one or more RSRP levels of the cell as the associated reference RSRP level.

4. The device of claim 2, wherein the device is caused to determine the one or more reference RSRP levels by:
   in accordance with a determination that the radio link quality is higher than the second threshold quality, Qin, in the cell within the time period, determining a RSRP level of the determined one or more RSRP levels of the cell as the associated reference RSRP level.

5. The device of claim 1, wherein the device is caused to:
   in accordance with a determination that the device has not sent any out of sync indication within the time period, consider that the relaxation criterion is fulfilled.

6. The device of claim 1, wherein the measurements for failure detection in the cell comprise measurements for radio link monitoring and measurements for beam failure detection.

7. The device of claim 1, wherein the reference signal is a synchronization signal block or a channel state information reference signal, CSI-RS.

8. The device of claim 1, wherein the device is further caused to:
   evaluate that the relaxation criterion is fulfilled, if a difference between at least one of the determined one or more RSRP levels of the cell and the associated reference RSRP level of the one or more reference RSRP levels is within a threshold level.

9. The device of claim 1, wherein the device is caused to determine the one or more reference RSRP levels by:
   determining a RSRP level of the determined one or more RSRP levels of the cell as the associated reference RSRP level of the one or more reference RSRP levels, in an event comprising at least one of a radio link failure, radio resource control reestablishment, a beam failure detection, beam recovery or redirection.

10. The device of claim 1, wherein the device is caused to determine the one or more RSRP levels of the cell by:
    determining the highest RSRP of one or more reference signals on a measurement occasion of the one or more measurement occasions; and
    determining, based on the highest RSRP, a RSRP level of the cell for the measurement occasion of the one or more measurement occasions.

11. The device of claim 1, wherein the device is caused to determine the one or more RSRP levels of the cell by:
    determining the highest RSRP of one or more reference signals on a measurement occasion of the one or more measurement occasions;
    determining at least one previous highest RSRP of one or more reference signals on at least one previous measurement occasion; and
    determining a RSRP level of the cell for the measurement occasion of the one or more measurement occasions, based on the highest RSRP for the measurement occasion of the one or more measurement occasions and the least one previous highest RSRP for the at least one previous measurement occasion.

12. The device of claim 1, wherein the device is a user equipment with low mobility.

13. A method, performed by a user equipment, comprising:
performing measurements on one or more reference signals on one or more measurement occasions;
determining one or more reference signal received power, RSRP, levels of a cell based on the measurements on the one or more reference signals on the one or more measurement occasions;
determining one or more reference RSRP levels reflecting radio link quality or beam quality after handover or beam change, one of the one or more reference RSRP levels being associated with one of the determined one or more RSRP levels of the cell;
evaluating a relaxation criterion based on the one or more reference RSRP levels and the determined one or more RSRP levels of the cell; and
in accordance with an evaluation that the relaxation criterion has been fulfilled for a time period, relaxing measurements for at least one of radio link monitoring or beam failure detection in the cell
wherein the determining of the one or more reference RSRP levels comprises, in accordance with a determination that a device has not sent an out of sync indication within the time period, determining a RSRP level of the determined one or more RSRP levels of the cell as the associated reference RSRP level.

14. The method of claim 13, wherein the determining the one or more reference RSRP levels reflecting the radio link quality or beam quality is based on at least one of:
a first threshold quality for controlling when the user equipment is required to perform RSRP measurements on neighboring cells;
a second threshold quality, Qin, or a third threshold quality, Qout, for the purpose of monitoring downlink radio link quality and/or beam quality.

15. The method of claim 14, wherein determining the one or more reference RSRP levels comprises:
in accordance with a determination that the RSRP level of the determined one or more RSRP levels of the cell is higher than the first threshold quality, determining the RSRP level of the determined one or more RSRP levels of the cell as the associated reference RSRP level.

16. The method of claim 14, wherein the determining the one or more reference RSRP levels comprises:
in accordance with a determination that the radio link quality is higher than the second threshold quality, Qin, in the cell within the time period, determining a RSRP level of the determined one or more RSRP levels of the cell as the associated reference RSRP level.

17. The method of claim 13, comprising:
in accordance with a determination that the user equipment has not sent any out of sync indication within the time period, consider that the relaxation criterion is fulfilled.

18. The method of claim 14, wherein the reference signal is a synchronization signal block or a channel state information reference signal, CSI-RS.

19. The method of claim 14, wherein determining the one or more reference RSRP levels comprises:
determining a RSRP level of the determined one or more RSRP levels of the cell as the associated reference RSRP level of the one or more reference RSRP levels, in an event comprising at least one of a radio link failure, radio resource control reestablishment, a beam failure detection, beam recovery or redirection.

20. A non-transitory computer readable storage medium comprising program instructions stored thereon, the instructions, when executed by a processor of a device, cause the device to perform the method as claimed in claim 13.

21. An apparatus comprising:
at least one processor; and
at least one memory storing instructions that, when executed by the at least one processor, cause the apparatus at least to:
perform measurements on one or more reference signals on one or more measurement occasions;
determine one or more reference signal received power, RSRP, levels of a cell, where the one or more RSRP levels of the cell are based on the measurements;
determine at least one reference RSRP level, where the at least one reference RSRP level at least partially indicates radio link quality or beam quality after handover or beam change, where the determining of the at least one reference RSRP level is based, at least partially, on a determination that the apparatus has not sent an out of sync indication within a time period;
associate one of the at least one reference RSRP level with one of the determined one or more RSRP levels of the cell as an associated reference RSRP level;
evaluate a relaxation criterion based on: the at least one reference RSRP level and the determined one or more RSRP levels of the cell; and
based on a determination that the relaxation criterion has been fulfilled for the time period, relax measurements for at least one of radio link monitoring or beam failure detection in the cell,
where the determining of the at least one reference RSRP level comprises determining that a RSRP level of the determined one or more RSRP levels of the cell is the associated reference RSRP level.

* * * * *